Figure 1:

(No Model.)

C. I. LOVEREN.
CHUCK FOR GEM SETTINGS.

No. 321,041. Patented June 30, 1885.

ATTEST.
J. Henry Kaiser
Harry L. Ames

INVENTOR.
Charles I. Loveren
by Geo. H. Graham
atty

UNITED STATES PATENT OFFICE.

CHARLES I. LOVEREN, OF BROOKLYN, NEW YORK.

CHUCK FOR GEM-SETTINGS.

SPECIFICATION forming part of Letters Patent No. 321,041, dated June 30, 1885.

Application filed July 21, 1884. (No model.)

*To all whom it may concern:*

Be it known that I, CHARLES I. LOVEREN, a citizen of the United States, residing in the city of Brooklyn, county of Kings, and State of New York, have invented certain new and useful Improvements in Chucks for Holding Gem-Settings, fully described and represented in the following specification and the accompanying drawings, forming a part of the same.

The present invention relates to that class of holding devices used to grasp the material to be operated upon in lathes and other similar machines, and are known to those familiar with their use as "spring-chucks." Ordinarily, these spring chucks are used in what is known as a "hollow-spindle lathe," the interior of the spindle of which is provided, in front of its front bearing, with an incline of about the same degree of inclination as that formed on the back of the face end of the chuck, and acts when the chuck is drawn into the hollow spindle (this being accomplished by a back nut fitting over the threaded rear end of the chuck and having a bearing against the rear end of the lathe-spindle) to force or crowd the sections or jaws of the chuck at its front end together, and in so doing securely clamp the material which may have been inserted within them and thus hold it firmly in place; and by unscrewing said back nut the chuck will, by reason of the spring-like action of its jaws in conjunction with the inclines before mentioned, automatically release its hold upon the material and allow it to be withdrawn from the chuck. A similar construction, so far as the action of the chuck is concerned, is shown in United States Letters Patent No. 297,611, granted to me April 29, 1884, and it is for use in an attachment to a lathe for making settings, &c., as is therein described, that the present invention is specially designed.

In finishing the cutting operation on settings for gems and the like, it is necessary, after the ordinary "cramps" have been cut, to reverse the setting and cut certain slight grooves in its reverse or under side, and in so doing great difficulty has been encountered in suitably holding the partly-finished setting so that this last operation may be performed without partially or wholly destroying the setting, which, by reason of the nature of its cramps, will, upon the slightest pressure brought to bear against them, either all bend inward or be broken off entirely.

It is the object of this invention to provide a chuck or holding device for this character of work that will securely hold the partially-finished setting without destroying or disturbing its cramps, so that the setting may be further operated upon.

To this end the invention consists in providing the face of the chuck with recesses, together with saw-cuts corresponding in number with that of the cramps on a setting, so that each cramp, when the setting is inserted within the jaws of the chuck, will take into a recess or saw-cut and be protected from injury when the jaws are tightened upon the setting, as will be hereinafter particularly pointed out.

Figure 2:
Figure 3:
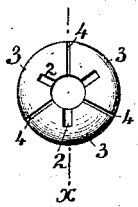
Figure 4:
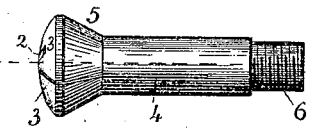

In the drawings, Figure 1 is a perspective view of a setting partially finished and provided with six cramps. Fig. 2 is a similar view of the same when finished. Fig. 3 is a face or front view of the improved chuck. Fig. 4 is a side elevation thereof, and Fig. 5 a central longitudinal section taken on the line *x x* of Fig. 4.

The chuck, as shown in the drawings, is provided, as usual, with a bevel or incline, 5, a screw-threaded rear end, 6, a central bore, 10, and spring-jaws 3, formed by the radially-positioned saw-cuts 4, which in the present instance are three in number. These radial cuts 4 are only of such length as to give the jaws the requisite spring-like action. The bore 10, it may be remarked in passing, is in practice of a diameter as large as it can be without weakening the chuck-body, and is stopped short of its front portion, and the continuation of the bore is then made of a diameter slightly smaller than the material or article it is to grasp, differing to this extent from the ordinary spring-chuck, which is provided with said continued bore of a diameter a shade greater than the article to be grasped, so that only a short distance through the chuck has to be accurately bored, and the holding-action is confined to that point where the pressure will exert its greatest holding-power; but, however, this is of no importance in the improved structure.

Figure 5:
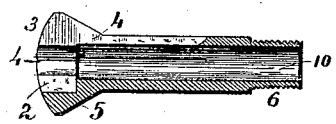

When the setting to be operated upon is formed with six cramps, as shown in Fig. 1, a chuck having the three saw-cuts 4 is provided with short recesses 2, extending from the bore radially into the face or front portion of the chuck, as is clearly shown in Figs. 3, 4, and 5. These recesses are positioned centrally between the saw-cuts 4, and may only extend into the body of the chuck a distance equal to the length of the setting, so that the chuck is not necessarily weakened thereby. The chuck is thus provided with as many recesses, including the saw-cuts 4, as there are cramps on the setting, so that each cramp will take into a recess and be protected therein when the jaws are tightened up to hold the setting securely, as will presently more fully appear. A chuck thus fashioned is placed in the spindle of the lathe or in the sleeve of the attachment described in the above-mentioned Letters Patent, and an unfinished setting—such as is shown in Fig. 1—having cramps corresponding in number with the recesses and saw-cuts of the chuck is inserted within its jaws 3, and so positioned therein that each cramp will take into a recess, 2, or saw-cut 4. In this position of the setting any movement of the jaws of the chuck inward as they are pressed together in the manner before explained will cause the openings formed by the saw-cuts 4 to close upon the cramps which are projecting therein, and thus grasp them tightly on either side, and during such action the remaining cramps which project into the recesses 2 will be protected thereby, and are not borne upon by the jaws—from which it will be seen that the holding of the setting is wholly effected by the pressure of the jaws upon the sides of those cramps lying in the saw-cuts, and thus no inward pressure is exerted upon the setting, and its cramps are therefore not disturbed or injured. The setting thus held is ready for the action of the devices which cut away the required material upon its projecting end, and when completed will have the appearance shown in Fig. 2. The setting may then be removed by loosening the pressure of the jaws upon the cramps, which is then ready for the polishing operation.

In holding settings having more than six cramps—say eight—the chuck would then be made with four radial saw-cuts, forming an equal number of jaws, and be also provided at equal distances between each saw-cut with a recess, making four, and eight with the saw-cuts, the saw-cuts and the recesses being formed in the same manner as has been described. It will therefore be apparent that a chuck may be made to hold a setting having any number of cramps, it being only necessary that there should be the same number of saw-cuts and recesses as there are cramps on the setting. It may also be observed that the large central bore going through the chuck from its back end might be substituted for one of the requisite diameter extending in a sufficient distance from the face of the chuck to give the required elasticity to its jaws; and, furthermore, that many other patterns of chucks might be used in the place of the spring-chuck described by providing them with sufficient recesses in their jaws, which, together with the space between their jaws, would equal the number of the cramps upon the setting.

What I claim is—

1. The herein-described chuck having spaces or radial cuts between its jaws and provided intermediate between said cuts with recesses, as 2, substantially as described.

2. The herein-described spring-chuck having saw-cuts forming the face thereof into jaws and provided with the recesses 2, substantially as described.

3. The herein-described chuck having a central bore, which at its face is of a diameter less than that of the article to be held, and provided with cuts and recesses into which projections or cramps upon the article may enter, substantially as described.

In testimony whereof I have hereunto set my hand in the presence of two subscribing witnesses.

CHARLES I. LOVEREN.

Witnesses:
GILMER CROWELL,
GEO. H. GRAHAM.